Feb. 12, 1946.  H. C. BEHRENS  2,394,589
CUTOFF DRIVE MECHANISM
Filed Aug. 23, 1944
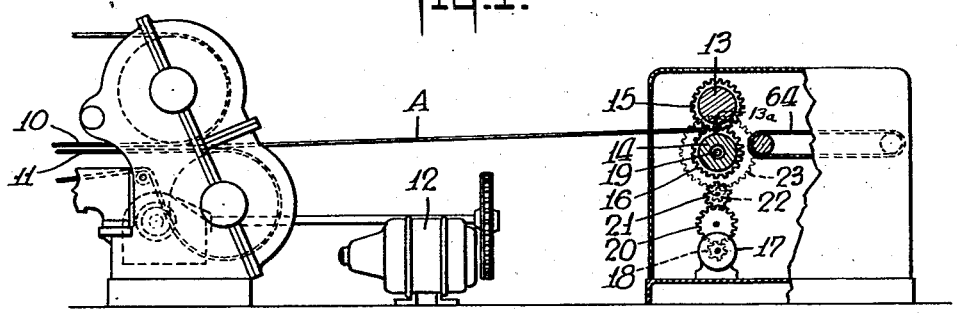
INVENTOR
Herbert C. Behrens
BY
ATTORNEYS Patented Feb. 12, 1946

2,394,589

UNITED STATES PATENT OFFICE 2,394,589

CUTOFF DRIVE MECHANISM

Herbert C. Behrens, Haddon Heights, N. J., assignor to Samuel M. Langston Co., Camden, N. J., a corporation of New Jersey Application August 23, 1944, Serial No. 550,835

5 Claims. (Cl. 164—68)

In the manufacture of double faced corrugated board, such for instance as that used in making blanks for shipping boxes, it is the usual practise to continuously produce the stiff sheet or board and continuously deliver it to a cut-off mechanism which subdivides it into sections or blanks, the length of which is predetermined in accordance with the periphery of the container to be made from said sections. Thus, for a given sheet speed, the frequency of the cutting operation must be adjusted for each blank length. In commercial practise these lengths are in the general range of 30 to 120 inches. In order to make a clean cut, the knife or other cutter should travel with and at the same speed as the advancing sheet during the cutting operation, and then move out of the path of the sheet and return to a position for reentering the sheet for the next cut. Thus, for a given sheet speed, the cutting speed must remain substantially constant but the return speed must be varied in accordance with the length of the blanks being cut to permit the desired time interval for the sheet to pass the cut-off mechanism to a distance equal to the length of the desired section between successive cuts. This return speed must be adjusted after the cutting of the required number of blanks of one length and to give the proper time cycle for cutting the next batch of blanks of a different length.

It is common practise to use a variable speed drive, such for instance as a Reeves drive, for varying the time cycle of the cutter, and to use in combination therewith some form of cutter actuating mechanism which will hold the cutter speed constant and the same as that of the sheet speed while cutting, but decelerate and then accelerate the cutter between successive cuts. The time cycle and the return speed in the cycle must be adjusted and preferably simultaneously for each change in sheet speed and for each blank length for a given sheet speed. A machine of the type above referred to is illustrated and described in the Sieg Patent 1,897,867 and in the Goettsch Patent 2,309,728.

Variable speed drives of the belt and cone pulley type are subject to variations in operation due to wear and to belt stretching and require compensating mechanism which must be adjusted from time to time in order to insure the accurate cutting of blanks of a preselected length. Such a mechanism is shown in my prior Patent 2,320,710.

The main object of the present invention is to secure the desired operations and control of the cutter both as to the total time cycle and as to the desired varying speed in the cycle and without the necessity of interconnecting mechanical units of the kinds heretofore employed.

As an important feature of my invention, I provide an electric motor for driving the cutter and so control the current supplied to the motor that it will alternately decelerate and accelerate during each time cycle so as to operate the cutter at the sheet speed during the cutting action and provide a time interval between successive cuts which may be in accordance with the sheet speed and the length of the blank to be cut. As a further feature there is provided simple and automatically operating mechanism for controlling the speed of the motor which drives the cutter, so that the proper amount of deceleration and acceleration may be readily established to obtain proper cutting and accurate blank lengths.

In carrying out my invention, I may employ a conventional form of machine for producing the stiff sheet or board, and in practise this may be a double facer for forming a composite sheet including an intermediate sheet of corrugated paper which connects and spaces opposite facing sheets. I may also provide a cutter of conventional form, which in practise preferably comprises a pair of parallel rotatable shafts geared together and one or both having a cutter element for transversely cutting off a blank from the advancing sheet passing between the shafts, once for each revolution of said shafts. These may be of conventional form, but as an important feature, the cutter is driven by a separate prime mover from that employed in driving the double facer. Various different embodiments of my invention may be employed for controlling the speed of the prime mover which operates the cutter to change the time cycle of the cutter and for varying the rotational speed of the cutter during the interval between successive cuts.

In the accompanying drawing,

Fig. 1 is a partial side elevation and partial section of a portion of a machine embodying my invention.

Fig. 2 is a vertical section on the line 2—2 of Fig. 1, but on a larger scale.

Fig. 3 is a face view of a portion of the cutter unit viewed from the left side of Fig. 2 and on a still larger scale, and Fig. 4 is a wiring diagram of the speed control features.

In Fig. 1 there is shown a portion of the delivery end of a conventional double facer in which the stiff sheet A is delivered by a pair of belts 10 and 11 passing over pulleys which may be driven by a motor 12. The sheet passes between cutter shafts 13 and 14 having interengaging blades 13a for transversely severing the sheet A, once for each complete revolution of said shafts. As shown in Fig. 2, the shafts are connected by meshing gears 15, 16 of equal size so as to insure the simultaneous and opposite rotation of the shafts. For driving the cutter mechanism there is provided a motor 17 having a pinion 18 driving a shaft 19 through a suitable train of gears 20, 21, 22 and 23 or any other suitable power transmitting and speed reducing mechanism. The shaft 19 is coaxial with and extends through the cutter shaft 14 and is connected to the two cutter shafts by a mechanism which may be of the type shown in my prior Patent 2,262,913, although it may be of any other type which will produce substantially the same result.

As shown, this mechanism includes a crank 24 on the shaft 19, a crank 25 on the coaxial shaft 14, and a lever arm 26 pivoted intermediate of its ends on an adjustable pivot pin 27. The position of the pivot pin 27 may be adjusted from a position coaxial with the shafts 14 and 19, as shown in Fig. 2, toward the crank pin of one of the cranks to vary the effective length of the end portions of the lever. The lever thus has three pivotal connections; one on the pin 27 and the other two on the crank pins of the cranks 24 and 25. Any two of these connections should be slidable along the lever and the other one non-slidable. As shown, the lever has a non-sliding connection with the crank pin of the crank 24 and blocks slidable along the lever receive and are journalled on the pivot pin 27 and the crank pin of the crank 25 respectively.

For adjusting the position of the pivot pin 27 along the lever 26, this pin is mounted on a block 28 threaded on an adjusting screw 29 which may be rotated by miter gears 30 connecting the adjusting screw to an operating shaft 31. Thus, by rotating the shaft 31, the pivot pin 27 may be moved toward the pin of the crank 24 so that the effective length of the opposite end portions of the lever may be varied. With the pin 27 in alignment with the shaft 19, the cutter shafts 13 and 14 will operate at uniform speed, but by moving the pin 27 toward one of the crank pins, the speed of the cutter shafts will accelerate and decelerate to varying degrees during a given time cycle of complete rotation and to give the cutter a speed corresponding to the sheet speed at the instant of each sheet cutting operation. As previously noted, this mechanism may be substantially the same as shown in my prior Patent 2,262,913, except that in prior commercial uses of such mechanism, it has been driven through a Reeves drive from the motor operating the double facer.

As an important feature of my invention, I provide means for varying the speed of the cutter driving motor 17 and the speed of the double facer driving motor 12 simultaneously and to the same effective extent so that the cutter speed, when cutting, will always be the same as the sheet speed. As a further feature, I provide means for simultaneously changing the time cycle of the cutter driving motor 17 and the eccentric position of the pivot pin 27 to the same effective extent for cutting sections or blanks of different lengths. By changing the speed of the motor in respect to the speed of the double facer, the time cycle of the cutter is changed to cut longer or shorter blanks, and by simultaneously changing the position of the pivot pin 27, the extent of acceleration and deceleration of the cutter shaft is varied so that for any desired time cycle and length of blank, the cutter elements will travel at the sheet speed at the instant of cutting.

As shown in Fig. 4, the electric power input is from feed lines 40 and 41. The feed line 40 leads to the double facer driving motor 12 while the other feed line 41 leads to a rheostat arm 42 whereby the speed of the motor 12 may be varied by moving the arm over a resistance element 43. The feed line 40 has a branch line 44 leading to the cutting driver motor 17 and the other line 45 from the motor is connected to one end of a resistance element 46. A rheostat arm 47 is movable over this resistance element and is connected to a line 48 leading to one end of a resistance element 49 over which a rheostat arm 50 connected to the feed line 41 may move. The rheostat arms 42 and 50 are connected together for simultaneous movement. Thus, by moving the double rheostat arms 42, 50, the speeds of the motors 12 and 17 are changed to the same operative extent and the time cycle of the cutter is made to agree with the sheet speed for any given length of blank to be cut. Thus, the operator may at will stop, start, or vary the speed of the machine as a whole without disturbing the adjustment of the cutter set at the resistance 46 for cutting a particular length of blank. By moving the rheostat arm 47, the speed of the cutter operating motor 17 may be controlled independent of the speed of the double facer motor 12 to cut sheets of any desired length.

As an important feature of the invention, the pivot pin 27 is adjusted simultaneously with the adjustment of the speed of the motor 17 for securing different time cycles for a given sheet speed. The adjustment of the arm 47 and the pivot pin 27 may be effected by hand or by an electric motor or any other suitable means. As shown, there is provided a handwheel 55 on the shaft 31 which adjusts the pin 27. The handwheel 55 also actuates a shaft 57 through suitable gearing 58 which may be mounted in a casing 59 on one side of the frame of the cutter mechanism. On the outer face of this casing, there is provided a scale 60 calibrated to indicate the various different lengths of sections or blanks which are to be cut off. The shaft 57 has a pointer 61 movable over this scale so that by turning the handwheel 55 to bring the pointer to any particular sheet length indicated on the scale, the pivot pin 27 will be moved to the proper position for that sheet length. The resistance element 46 is mounted in the casing 58 concentric with the shaft 57, and the rheostat arm 47 is secured to the shaft 57. Thus, by turning the shaft 57, the speed of the motor 17 is changed to give the desired sheet length and the pin 27 is simultaneously adjusted to insure the proper speed of the cutter element at the instant of cutting and the proper deceleration and acceleration between successive cuts. The shaft 57 may be turned by the handwheel 55 or by any other suitable means such as a motor 62.

In the form illustrated, there is only a single cutting mechanism for acting on the sheet A. It will be understood that a plurality of cutting mechanisms may be employed and each with its own driving motor, as indicated in Fig. 4 of the Goettsch Patent 2,309,728, and each cutting mechanism acting on a separate strip formed by the slitting of the sheet at a point between the double facer and the cut-off mechanism, as also indicated in that same figure. The slitting mechanism may also act to trim and score the sheet and may be the same in construction as is shown in my prior Patent 2,291,789. The cut-off sections coming from the cutter may be received on a conveyor 64 or disposed of in any other suitable manner.

My improved machine differs from that shown in the Goettsch patent in that the cutter mechanism and the double facer are driven by independent motors which may be simultaneously or independently controlled and it is not necessary to use any Reeves drive such as is shown in the Goettsch patent.

Having thus described my invention, what I claim as new and desire to secure by Letters Patent is:

1. A machine for making stiff sheets of preselected length including a mechanism for continuously producing and advancing the sheet material, a cutting mechanism having a cutter traveling with and at the same speed as the sheet material during the cutting action and having a variable speed of return movement, an electric motor for driving the first mentioned mechanism, a separate electric motor for driving the second mentioned mechanism, a double rheostat for simultaneously varying the speed of both of said motors and to the same extent, and a single rheostat in series with one part of said double rheostat for varying the speed of the second mentioned motor independently of the speed of the first mentioned motor to vary the time cycle of the cutting mechanism, and simultaneously varying the amount of deceleration and acceleration of the cutting mechanism between successive cutting actions.

2. An apparatus for producing sections of predetermined length of comparatively stiff sheet material, including a double facer for continuously producing and advancing sheet material, a cutter movable with and at the speed of the material at each instant of cutting, means for alternately decelerating and accelerating the cutter between successive cutting actions, an electric motor for driving said cutter, means for simultaneously varying the speed of said motor and the extent of said decelerating and accelerating movement of said cutter, and independent means for varying the speed of said motor upon variation in the speed of travel of the sheet material from said double facer.

3. A machine for making stiff sheets of preselected length including a mechanism for continuously producing and advancing the sheet material, a cutting mechanism for acting on said material and adjustable to give said pre-selected length, separate electric motors for said mechanisms, a double rheostat for simultaneously varying the speeds of both motors, and a single rheostat in series with one part of said double rheostat for independently varying the speed of the motor of said cutting mechanism to vary said length.

4. A machine for making stiff sheets of preselected length including a mechanism for continuously producing and advancing the sheet material, a cutting mechanism having a cutter traveling with and at the same speed as the sheet material during the cutting action and having a variable speed of return movement, an electric motor for driving the first mentioned mechanism, a separate electric motor for driving the second mentioned mechanism, a double rheostat for simultaneously varying the speed of both of said motors and to the same extent, and means in series with one part of said double rheostat for varying the speed of the second mentioned motor independently of the speed of the first mentioned motor to vary the time cycle of the cutting mechanism, and simultaneously varying the amount of deceleration and acceleration of the cutting mechanism between successive cutting actions.

5. A machine for making stiff sheets of preselected length, including a mechanism for continuously producing and advancing the sheet material, a cutting mechanism for acting on said material and adjustable to give said pre-selected length, separate electric motors for said mechanisms, a double rheostat for simultaneously varying the speeds of both motors, and means in series with one part of said double rheostat for independently varying the speed of the motor of said cutting mechanism to vary said length.

HERBERT C. BEHRENS.